(12) United States Patent
Thurber

(10) Patent No.: US 10,848,420 B2
(45) Date of Patent: Nov. 24, 2020

(54) DYNAMIC FORWARDING FEATURES IN NETWORK ELEMENTS

(71) Applicant: Cisco Technology, Inc., San Jose, CA (US)

(72) Inventor: Andrew Phillips Thurber, Charlotte, VT (US)

(73) Assignee: CISCO TECHNOLOGY, INC., San Jose, CA (US)

(*) Notice: Subject to any disclaimer, the term of this patent is extended or adjusted under 35 U.S.C. 154(b) by 12 days.

(21) Appl. No.: 15/894,340

(22) Filed: Feb. 12, 2018

(65) Prior Publication Data

US 2019/0253349 A1 Aug. 15, 2019

(51) Int. Cl.
| | |
|---|---|
| *H04L 12/28* | (2006.01) |
| *H04L 12/741* | (2013.01) |
| *H04L 29/06* | (2006.01) |
| *H04L 12/24* | (2006.01) |
| *H04L 29/08* | (2006.01) |

(52) U.S. Cl.
CPC .............. *H04L 45/74* (2013.01); *H04L 41/08* (2013.01); *H04L 67/34* (2013.01); *H04L 69/22* (2013.01)

(58) Field of Classification Search
CPC ...................................................... H04L 45/74
See application file for complete search history.

(56) References Cited

U.S. PATENT DOCUMENTS

| | | | | |
|---|---|---|---|---|
| 6,483,804 | B1 * | 11/2002 | Muller | H04L 49/602 |
| | | | | 370/230 |
| 7,453,887 | B2 * | 11/2008 | Thubert | H04L 29/06 |
| | | | | 370/395.52 |
| 7,646,759 | B2 | 1/2010 | Hegde et al. | |
| 8,547,998 | B2 * | 10/2013 | Moon | H04W 80/045 |
| | | | | 370/467 |
| 8,705,340 | B2 * | 4/2014 | Gong | H04L 1/0002 |
| | | | | 370/216 |
| 8,964,752 | B2 | 2/2015 | Zhang et al. | |
| 9,565,103 | B1 * | 2/2017 | Sidebottom | H04L 45/72 |
| 9,819,584 | B2 * | 11/2017 | Takashima | H04L 12/4625 |
| 10,021,030 | B2 * | 7/2018 | Gan | H04L 41/00 |
| 10,135,734 | B1 * | 11/2018 | Singh | H04L 45/7453 |

(Continued)

FOREIGN PATENT DOCUMENTS

| | | |
|---|---|---|
| WO | 2017121471 A1 | 7/2017 |
| WO | 2017124330 A1 | 7/2017 |

*Primary Examiner* — Guang W Li
(74) *Attorney, Agent, or Firm* — Edell, Shapiro & Finnan, LLC

(57) ABSTRACT

A network element dynamically adjusts the forwarding plane based on a received packet. The network element receives a packet that is formatted according to a packet type. The network element determines whether the network element is configured to process the packet type. Responsive to a determination that that network element is not configured to process the packet type, the network element sends packet information to a network controller. The network element receives at least one packet handling module that includes instructions for processing the packet type of the received packet. Installing the at least one packet handling module on the network element configures the network element to process the packet type. The network element processes the packet according to the instructions in the at least one packet handling module.

20 Claims, 7 Drawing Sheets

(56) References Cited

U.S. PATENT DOCUMENTS

| | | | |
|---|---|---|---|
| 10,200,282 B1* | 2/2019 | Sidebottom | H04L 45/72 |
| 2003/0043800 A1* | 3/2003 | Sonksen | H04L 69/22 |
| | | | 370/389 |
| 2004/0133692 A1* | 7/2004 | Blanchet | H04L 29/12358 |
| | | | 709/230 |
| 2005/0160182 A1* | 7/2005 | Dutta | H04L 69/32 |
| | | | 709/243 |
| 2011/0261812 A1* | 10/2011 | Kini | H04L 12/4633 |
| | | | 370/389 |
| 2013/0235869 A1* | 9/2013 | Akiyoshi | H04L 45/38 |
| | | | 370/389 |
| 2014/0089498 A1* | 3/2014 | Goldfarb | H04L 63/0263 |
| | | | 709/224 |
| 2014/0098669 A1* | 4/2014 | Garg | H04L 47/12 |
| | | | 370/235 |
| 2014/0119231 A1* | 5/2014 | Chan | H04L 47/34 |
| | | | 370/253 |
| 2014/0133486 A1* | 5/2014 | Sivasankar | H04L 45/245 |
| | | | 370/392 |
| 2015/0023353 A1* | 1/2015 | Yamato | H04L 61/103 |
| | | | 370/392 |
| 2015/0172189 A1* | 6/2015 | Pitchai | H04L 45/7453 |
| | | | 370/392 |
| 2015/0289303 A1* | 10/2015 | Zhang | H04W 76/12 |
| | | | 370/328 |
| 2016/0127894 A1* | 5/2016 | Kahn | H04W 12/04 |
| | | | 380/270 |
| 2016/0134727 A1* | 5/2016 | Merkel | G06F 13/385 |
| | | | 370/474 |
| 2016/0205441 A1* | 7/2016 | Iguchi | H04L 69/22 |
| | | | 725/67 |
| 2016/0212017 A1 | 7/2016 | Li et al. | |
| 2016/0226760 A1* | 8/2016 | Liljenstolpe | H04L 45/74 |
| 2016/0234127 A1* | 8/2016 | Agarwal | H04L 47/34 |
| 2016/0241467 A1* | 8/2016 | Gunasekaran | H04L 45/42 |
| 2016/0285753 A1* | 9/2016 | Guleria | H04L 45/38 |
| 2017/0070416 A1* | 3/2017 | Narayanan | H04L 45/02 |
| 2017/0279937 A1* | 9/2017 | Shi | H04L 69/167 |
| 2018/0041431 A1* | 2/2018 | Yifrach | H04L 45/306 |
| 2018/0041614 A1* | 2/2018 | Ben-Chen | H04L 69/321 |
| 2018/0097722 A1* | 4/2018 | Callard | H04L 45/38 |
| 2019/0045034 A1* | 2/2019 | Alam | H04L 69/161 |
| 2019/0132250 A1* | 5/2019 | Horn | H04L 47/2441 |

* cited by examiner

DYNAMIC FORWARDING FEATURES IN NETWORK ELEMENTS

TECHNICAL FIELD

The present disclosure relates to configuring network elements in a computer network.

BACKGROUND

Forwarding planes in network elements provide the capability of the network element to forward data that arrives at the network element toward the proper destination. Hardware and software forwarding planes are typically complex, largely static, and mostly monolithic. Network administrators typically plan and configure the features of the forwarding plane on the network element in advance of deployment of the network element. For instance, software routers, firewalls, load balancers, and service chain hops are generally configured in advance based on knowledge or assumptions about the traffic expected on the network element.

DESCRIPTION OF EXAMPLE EMBODIMENTS

Overview

Figure 1:
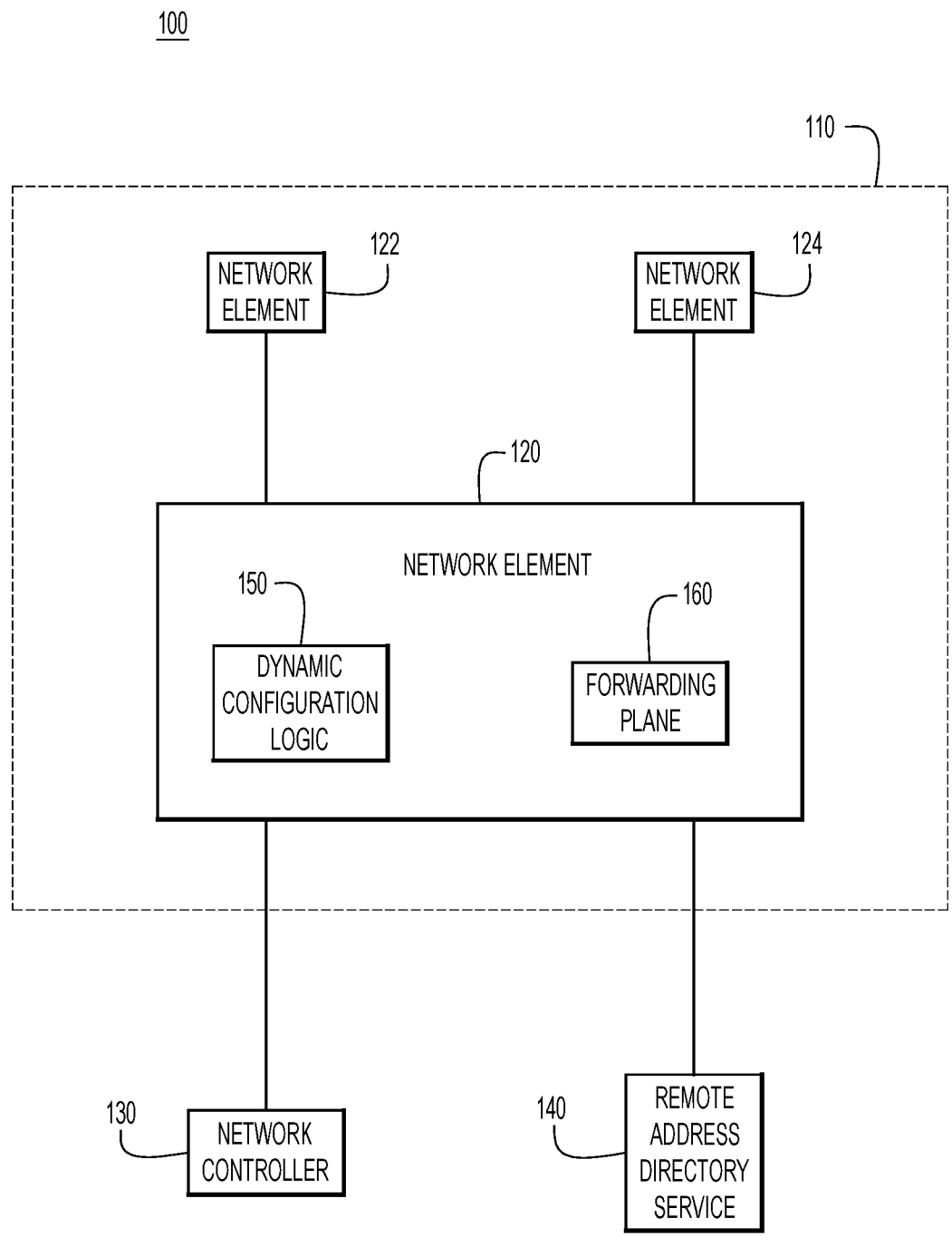
FIG. 1 is a simplified block diagram of a system for dynamically updating the forwarding plane of a network element, according to an example embodiment.

In one embodiment, a method is provided for a network element to dynamically adjust the forwarding plane based on a received packet. The method includes receiving a packet at the network element, wherein the packet is formatted according to a packet type. The method also includes determining whether the network element is configured to process the packet type. Responsive to a determination that that network element is not configured to process the packet type, the method includes sending packet information to a network controller. The method further includes receiving at least one packet handling module that includes instructions for processing the packet type of the received packet. Installing the at least one packet handling module on the network element configures the network element to process the packet type. The method also includes processing the packet according to the instructions in the at least one packet handling module.

DETAILED DESCRIPTION

In pre-configuring the capabilities of a network element before deployment, a network operator may allocate forwarding plane resources to packet handling that is never needed. Additionally, network traffic of an unknown type may be dropped due to a lack of awareness on the part of the network operator. Continuously "punting" unknown traffic to be handled at the network controller presents additional expense and latency in handling the network traffic.

In some instances, the desired forwarding behavior may evolve over time beyond the initial configuration of the network element. For example, new data protocols may be developed for data transmissions over existing networks. Additionally, new features (e.g., firewalls, intrusion detection/prevention, network address translation, etc.) may be developed that improve on previous versions. Further, as the network expands, additional features may be required by a client of the network operator. Additionally, the placement of each network element in the network may affect the desired forwarding behavior of each network element. A network operator may optimize a network by allowing different nodes in the network to forward traffic with different capabilities.

According to the techniques presented herein, a network operator may create a closed software defined network (SDN) loop to automatically add and/or remove forwarding plane features as needed, based on actual traffic. When an unknown packet type arrives at a forwarding plane of a network element, the network element sends the packet (or a packet signature) to a management plane (e.g., on a remote network controller). The management plane uses the packet information to select and dynamically add forwarding modules to the forwarding plane, without restarting the forwarding instance. The forwarding plane may be any extensible hardware or software forwarding element. If the needed module is not present in the forwarding plane of a network element, the module may be downloaded to the network element. The management plane may identify "unknown" traffic based on header types or more granular content matching.

Referring now to FIG. 1, a network system 100 is shown that is configured with a dynamically adaptable forwarding plane. The network system 100 includes a network 110 comprising network element 120, 122, and 124. In one example, the network elements 120, 122, and 124 may be hardware or software based switches and/or routers. The network system 100 also includes a network controller 130 configured to manage the network elements 120, 122, and 124 in the network 110.

The network system 100 further includes a remote address directory service 140 configured to provide network addresses associated with endpoint identifiers. In one example, the remote address directory service 140 may be a Domain Name Service (DNS) or a Locator/Identifier Separation (LISP) mapping system. In another example, the remote address directory service 140 may be provided by the network controller 130. Alternatively, separate computing devices may provide the functionality of the remote address directory service 140 and the network controller 130.

The network element 120 includes dynamic configuration logic 150 and a forwarding plane 160. The dynamic configuration logic 150 is configured to enable the network element to dynamically load or unload packet handling modules according to the type of network traffic received at the network element 120. The forwarding plane 160 includes any packet handling modules that are currently installed on the network element 120. In one example, the network elements 122 and 124 include similar logic operable to configure the network elements 122 and 124 independently from network element 120.

Figure 2:
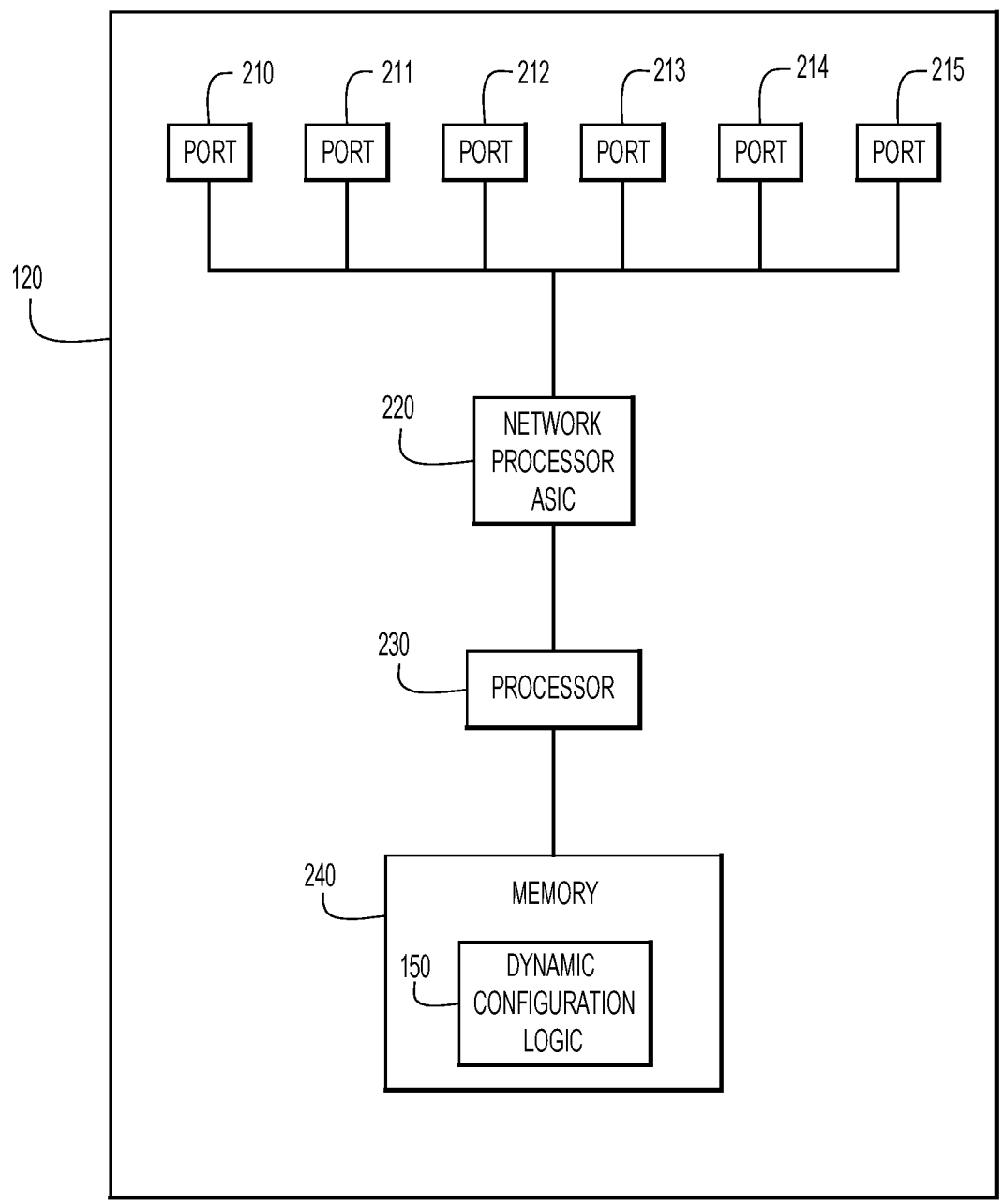
FIG. 2 is a simplified block diagram of a network device configured to dynamically update the forwarding plane of the network device, according to an example embodiment.

Referring now to FIG. 2, a simplified block diagram illustrates a network device (e.g., network element 120) that is configured to participate in the techniques presented herein. The networking device includes a network interface unit in the form of a plurality of network ports 210-215, a processor Application Specific Integrated Circuit (ASIC) 220 that performs network processing functions, one or more processors 230 (e.g., microprocessors or microcontrollers), and memory 240. The network device 120 may include multiple network processor ASICs to perform various network processing functions. The memory 240 stores the dynamic configuration logic 150, which may include instructions for punting unknown packets to the management plane. It is to be understood that, in certain examples, the network device 120 may be a virtual (software-based) appliance. The processor 230 performs higher level control functions of the network device 120, in concert with functions of the network processor ASIC 220.

The memory 240 may include read only memory (ROM), random access memory (RAM), magnetic disk storage media devices, optical storage media devices, flash memory devices, electrical, optical, or other physical/tangible memory storage devices. Thus, in general, the memory 240 may comprise one or more tangible (non-transitory) computer readable storage media (e.g., a memory device) encoded with software comprising computer executable instructions and when the software is executed (by the one or more processors 230) it is operable to perform the operations described herein. For example, the memory 240 stores instructions for the dynamic configuration logic 150 described above. When the processor 230 executes the instructions for the dynamic configuration logic 150, the processor 230 is caused to control the network device 120 to perform the operations described herein. As an alternative, the functions of the dynamic configuration logic 150 may be performed by the network processor ASIC 220.

Figure 3:
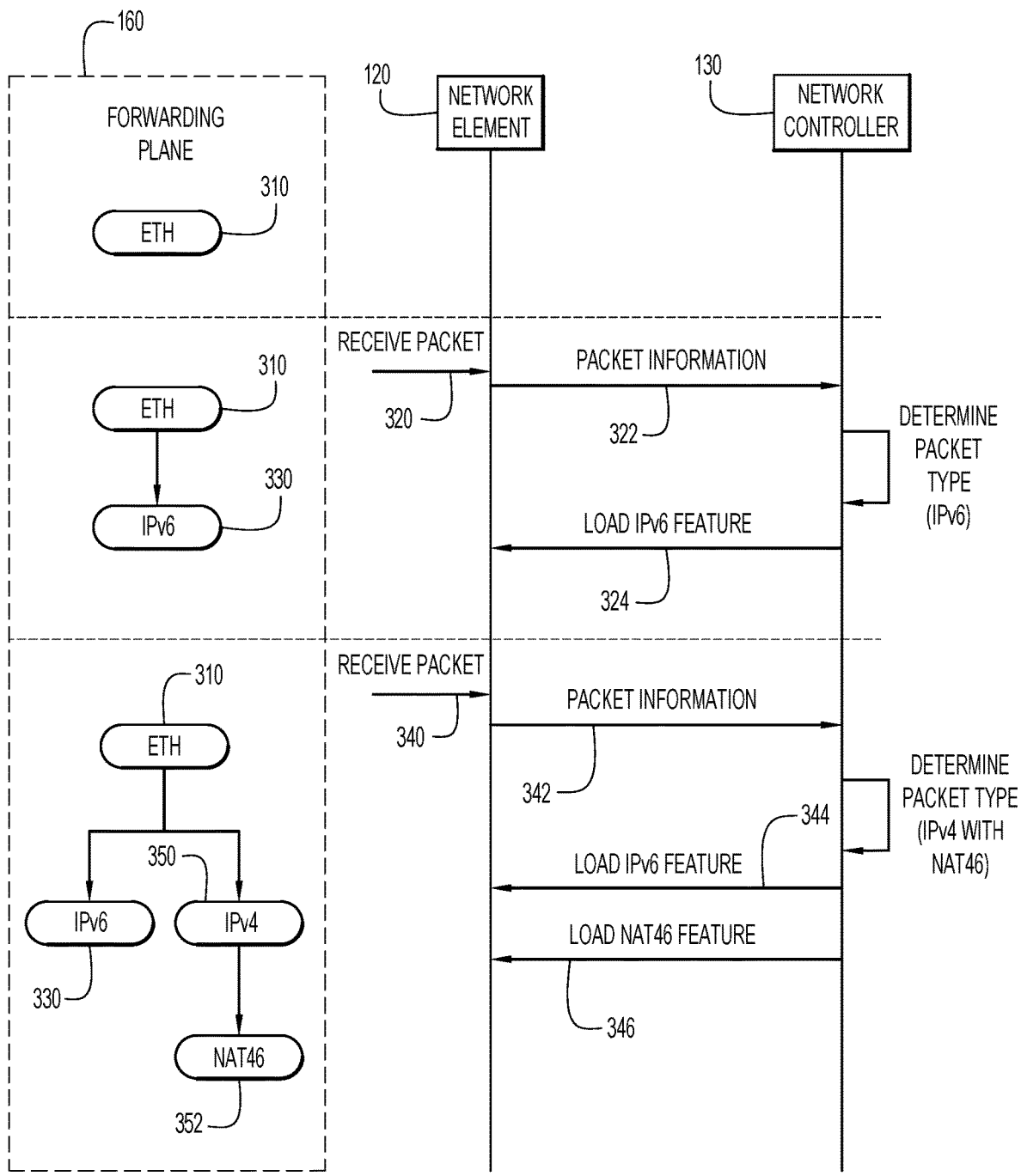
FIG. 3 illustrates updating the forwarding plane of a network device based on received packets, according to an example embodiment.

Referring now to FIG. 3, a message flow diagram illustrates the network element 120 dynamically configuring the forwarding plane 160 according to the traffic received at the network element 120. Initially, the forwarding plane 160 of the network element 120 includes only an Ethernet or other lower layer protocol (e.g., Layer 2 of the Open System Interconnection (OSI) model) handling module 310. In this state, the forwarding plane 160 does not have the capability to forward any data packets that arrive at a higher layer (e.g., at the Layer 3 network layer).

After the network element 120 receives a packet 320, the network element 120 sends packet information 322 to the network controller 130 to determine how to handle the packet 320. In one example, the packet information 322 may include a portion of the packet 320 (e.g., header information) or all of the packet 320. Upon receiving the packet information 322, the network controller 130 determines the packet type of the packet 320 (e.g., Internet Protocol version 6 (IPv6)) and selects a packet handling module that includes a feature with instructions enabling the network element 120 to process the packet 320. The network controller 130 sends the packet handling module in a message 324 that causes the network element 120 to add the packet handling module 330 (e.g., the IPv6 feature) to the forwarding plane 160 of the network element 120. Alternatively, the packet handling module 330 may already be available on the network element 120, but in a disabled state until the message 324 activates the packet handling module 330. With the IPv6 packet handling module 330 installed in the forwarding plane of the network element 120, any subsequent IPv6 packets that are received at the network element 120 can be forwarded without further instructions from the network controller 130.

When the network element 120 receives a packet 340 with a different packet type (e.g., Internet Protocol version 4 (IPv4)), the network element 120 punts the packet information 342 to the network controller 130. In one example, the packet information 342 may include a portion of the packet 340 (e.g., header information) or all of the packet 340. Upon receiving the packet information 342, the network controller 130 determines the packet type (e.g., IPv4). Additionally, the network controller 130 may determine additional features (e.g., Network Address Translation from IPv4 to IPv6 (NAT46)) based on the packet information 342 and/or a network policy stored on the network controller 130. The network controller 130 then sends a packet handling module in a message 344 that causes the network element 120 to add the packet handling module 350 (e.g., the IPv4 feature) to the forwarding plane 160 of the network element 120. Additionally, the network controller 130 sends a packet handling module in a message 346 that causes the network element 120 to add the packet handling module 350 (e.g., the NAT46 feature) to the forwarding plane 160 of the network element 120.

With the forwarding plane 160 including the Ethernet module 310, the IPv6 module 330, the IPv4 module 350, and the NAT46 module 352, the network element 120 is configured to process any of these types of packets. Notably, the forwarding plane 160 only includes modules for packets that have actually been received by the network element 120. This conserves computing resources that may otherwise be assigned to handling packets of types that the network element 120 has not received, and may never receive.

Figure 4:
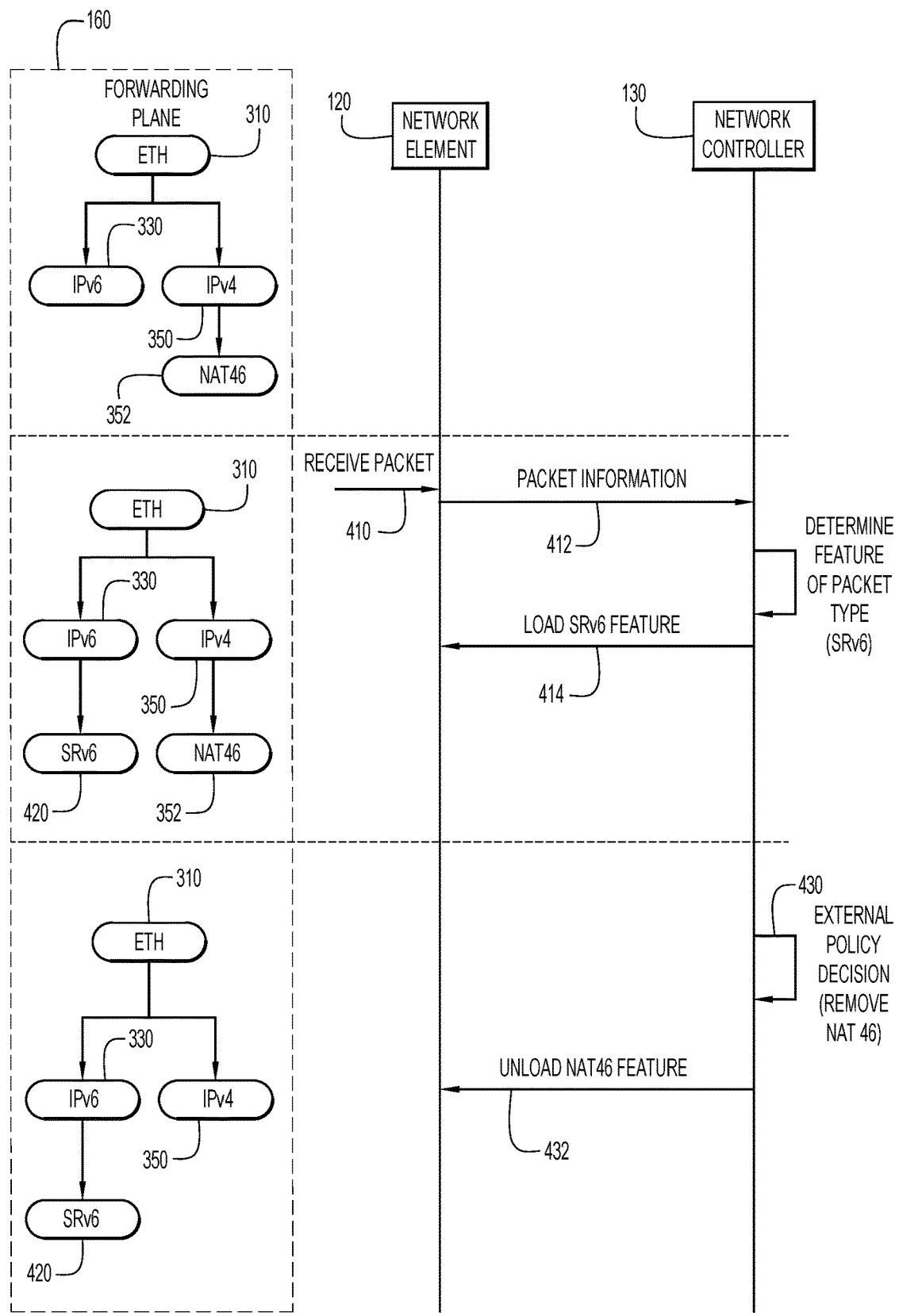
FIG. 4 illustrates updating features in the forwarding plane of a network device, according to an example embodiment.

Referring now to FIG. 4, a message flow diagram illustrates the network element 120 dynamically configuring the forwarding plane 160 according to the traffic received at the network element 120 and external policy decisions propagated from the network controller 130. Initially, the forwarding plane 160 of the network element 120 includes an Ethernet module 310, an IPv6 module 330, an IPv4 module 350, and a NAT46 module 352. Upon receiving a packet 410, the network element 120 sends packet information 412 to the network controller 130. The network controller 130 determines that the network element 120 requires an additional IPv6 module (e.g., a Segment Routing version 6 (SRv6) module) to process the packet 410. The network controller 130 sends a packet handling module in a message 414 that causes the network element 120 to add the packet handling module 420 (e.g., the SRv6 feature) to the forwarding plane 160 of the network element 120.

At a later time, an external policy decision 430 causes the network controller 130 to remove the NAT46 feature from the network element 120. The network controller 130 sends a message 432 to the network element 120 notifying the network element 120 to unload the NAT46 feature. In response to the notification in message 432, the network element removes the module 352 from the forwarding plane 160. In one example, the external policy decision may be based on a change/update to the NAT46 feature, and may be followed by an updated version of the NAT46 feature (e.g., a different NAT model or algorithm). Alternatively, the external policy decision may be a determination that the NAT46 feature is no longer required at the network element 120. For instance, the policy decision may be based on feedback from the network element 120 (e.g., the network element 120 has not received a packet requiring the NAT46 feature in a predetermined amount of time).

In another example, the network element 120 may maintain a time-out timer for each of the modules in the forwarding plane 160. If the network element 120 has not received a packet that requires a particular module in the forwarding plane 160 before the corresponding timer expires, then the network element 120 may unload the particular module from the forwarding plane 160. The network element 120 may subsequently notify the network controller 130 that the particular module has been unloaded. These time-out timers enable automatic aging of the modules in the forwarding plane, which supports greater network operator control and insight.

Figure 5:
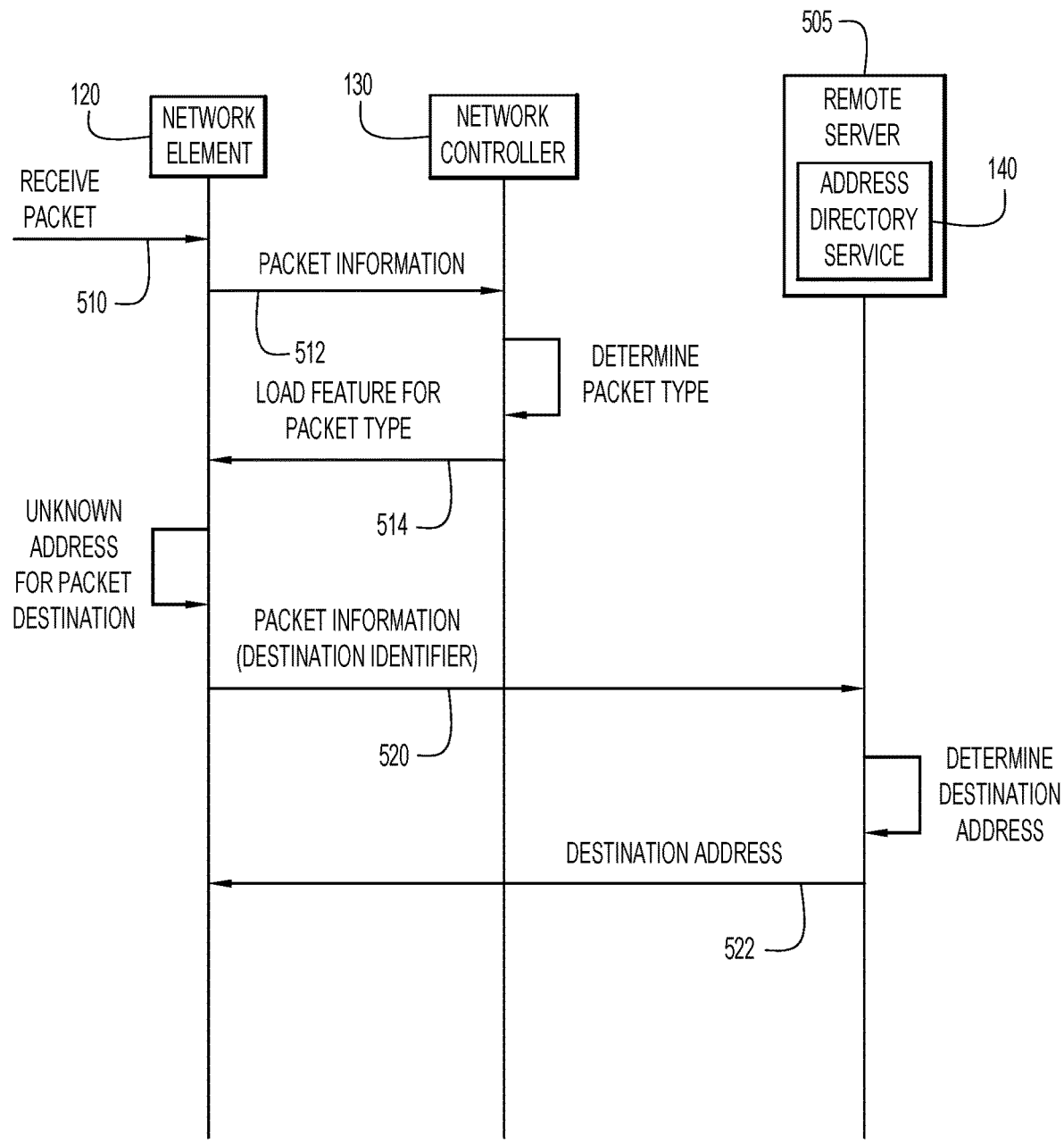
FIG. 5 illustrates determining how and where to forward a packet from different remote servers, according to an example embodiment.

Referring now to FIG. 5, a message flow diagram illustrates the network element 120 punting to a remote directory service on a remote server 505 to determine a destination address for a packet separately from the network element 120 punting to the network controller to request a packet handling module for the packet type associated with the packet. Initially, the network element 120 receives a packet 510 of an unknown type. The network element 120 sends packet information 512 to the network controller 130, which determines the packet type and selects one or more packet handling modules, as described with respect to FIG. 3 and FIG. 4. The network controller 130 sends a message 514 to the network element 120, enabling the network element 120 to process the packet type of packet 510.

As part of processing the packet 510 or a subsequent packet of the same packet type, the network element 120 may determine a destination identifier associated with the destination endpoint of packet 510, but not the network address of the destination endpoint. For instance, the packet 510 may include a domain name Universal Resource Locator (URL), which is resolved by a DNS. Alternatively, the packet may include an endpoint identifier (EID), which is associated with a Routing Locator (RLOC) in a LISP mapping system. The network element 120 sends packet information 520 to the address directory service 140 that is hosted on a remote server 505 separately from the network controller 130. The address directory service 140 determines the network address of the destination based on the packet information 520 and sends the destination network address to the network element 120 in a message 522.

In one example, the packet information 520 may include a destination identifier that was determined from the packet 510. The address directory service 140 may cross-reference the destination identifier in the packet information 520 to determine the destination address associated with the destination identifier. The address directory service 140 sends the destination address to the network element 120 enabling the network element 120 to send the packet 510 to the proper network address.

Figure 6:
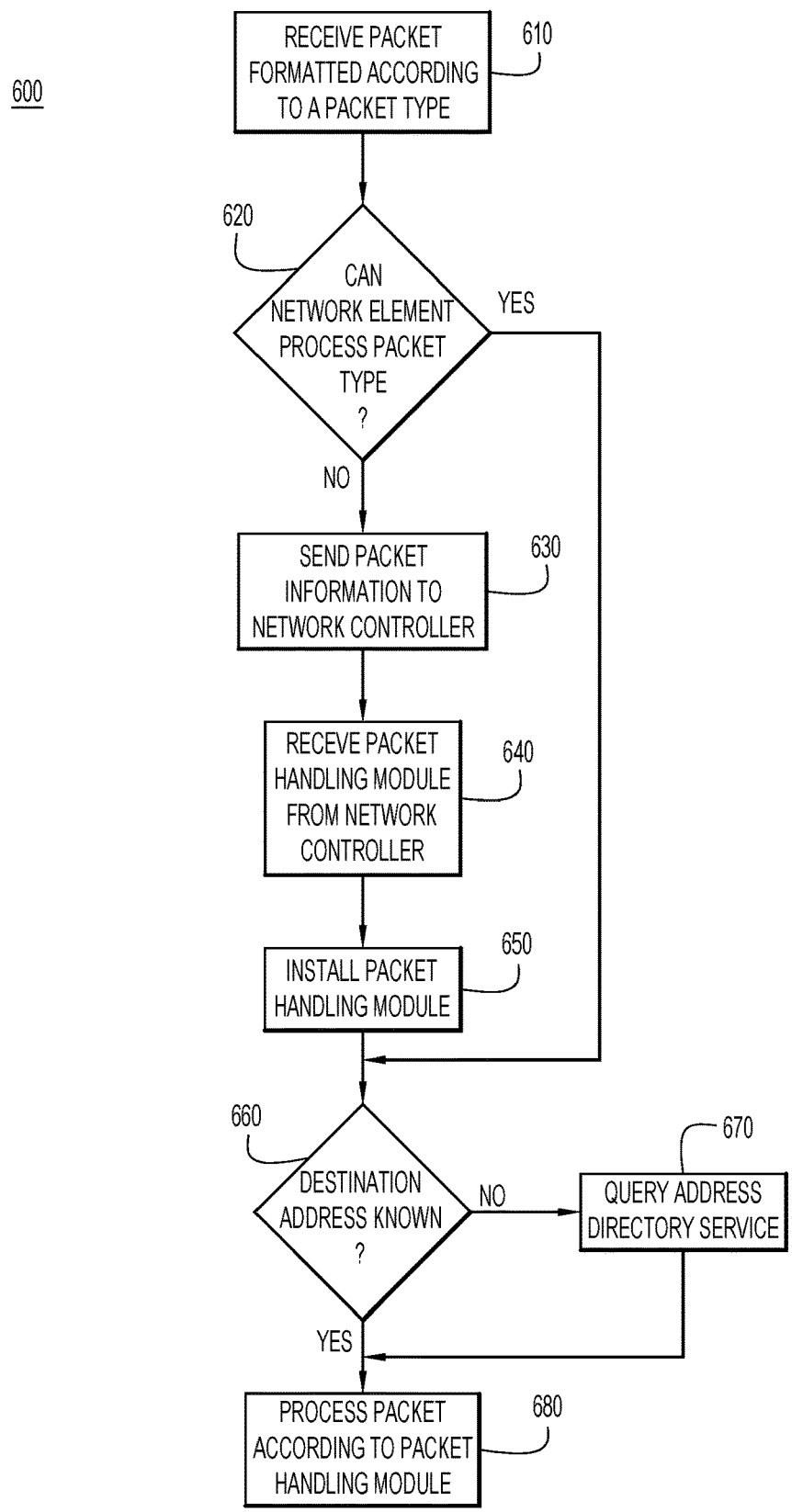
FIG. 6 is a flowchart depicting operations of a network element handling an unknown type of packet, according to an example embodiment.

Referring now to FIG. 6, a flowchart illustrates a process 600 by which a network element (e.g., network element 120) is dynamically configured with a packet handling module based on a received packet. At operation 610, the network element receives a packet formatted according to a packet type. If the network element is not configured to process the packet type, as determined at 620, then the network element sends packet information to a network controller at operation 630. In one example, the packet information may be some or all of the received packet. At operation 640, the network element receives at least one packet handling module from the network controller. The packet handling module(s) include instructions for processing the packet type of received packet. At operation 650, the network element installs the packet handling module(s), configuring the network element to process the packet type of the received packet.

Once the network element is configured to process the received packet, the network element determines if the destination address of the received packet is known. If the destination address is not known, as determined at 660, then the network element queries a remote address directory service at operation 670. In one example, the network element determines the destination endpoint of the received packet and queries the remote address directory service for the corresponding network address. The network element may then receive the destination address from the remote address directory service, enabling the network element to properly route the packet to the destination endpoint. At operation 680, the network element processes the packet according to the instructions in the packet handling module(s). In one example, a packet handling module may provide forwarding service for a particular protocol (e.g., IPv4, IPv6, etc.). Additionally, a packet handling module may provide a network service (e.g., NAT, Multiprotocol Label Switching (MPLS), Service Function Chain (SFC), filter, firewall, etc.).

Figure 7:
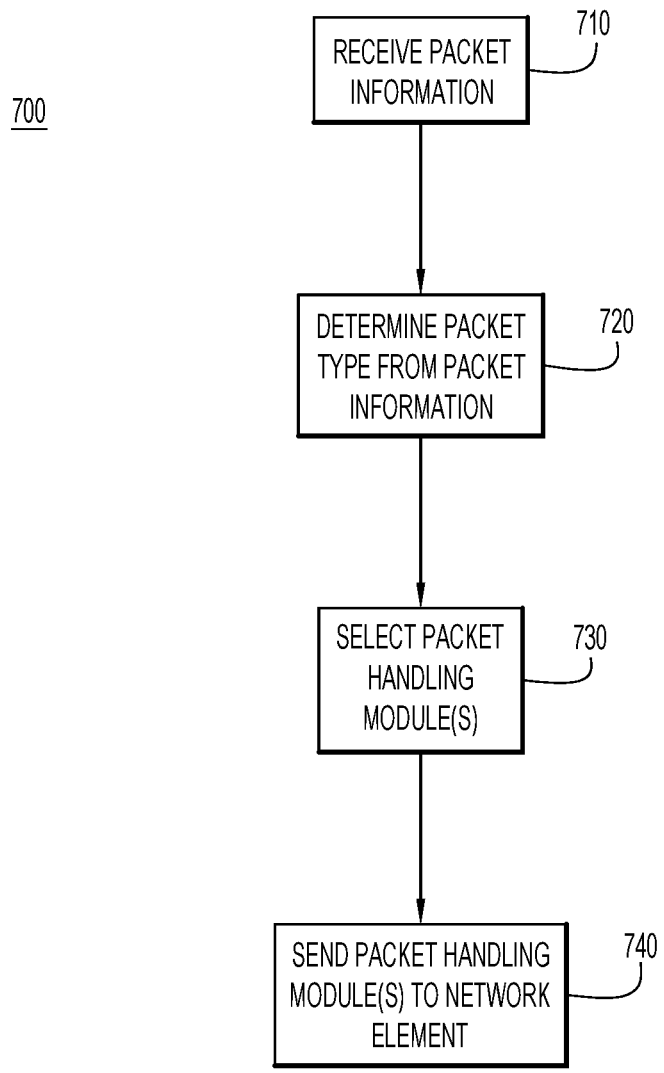
FIG. 7 is a flowchart depicting operations of a network controller determining how a network element should process an unknown type of packet, according to an example embodiment.

Referring now to FIG. 7, a flowchart illustrates a process 700 by which a network controller (e.g., network controller 130) enables a network element (e.g., network element 120) to be dynamically configured with a packet handling module based on a received packet. At operation 710, the network controller receives packet information from a network element. The packet information is associated with a packet received at the network element. At operation 720, the network controller determines a packet type associated with the packet based on the packet information received from the network element. In one example, the packet information may include some or all of the packet received by the network element.

At operation 730, the network controller selects at least one packet handling module based on the packet information received from the network element. In one example, the network controller may also select packet handling module(s) based on a network policy that is applied to the network element. At operation 740, the network controller sends the packet handling module(s) to the network element. The selected packet handling module(s) enable the network element to process the received packet.

In summary, the techniques presented herein create a closed loop to automatically extend forwarding planes as needed based on actual traffic received at network elements. These techniques provide network operators with flexibility and insight for distributed forwarding planes, enabling optimized networks and flexible network design. The techniques presented herein provide significantly more than merely punting unknown traffic, multiple forwarding rules (e.g., Forwarding Information Base (FIB) entries), and plugin-based forwarding planes that load at startup. The combination of punting unknown packet types and automatically extending the forwarding plane in response to received packet provides a significant improvement in the function of the network element, in that a "blank" network element may be quickly provisioned initially and automatically install the latest appropriate features based on the specific network deployment.

In one form, a method is provided for a network element to dynamically adjust the forwarding plane based on a received packet. The method includes receiving a packet at the network element, wherein the packet is formatted according to a packet type. The method also includes determining whether the network element is configured to process the packet type. Responsive to a determination that that network element is not configured to process the packet type, the method includes sending packet information to a network controller. The method further includes receiving at least one packet handling module that includes instructions on processing the packet type of the received packet. Installing the at least one packet handling module on the network element configures the network element to process the packet type. The method also includes processing the packet according to the instructions in the at least one packet handling module.

In another form, an apparatus is provided comprising a network interface and a processor. The network interface is configured to send and receive network traffic between computing devices. The processor is configured to receive via the network interface a packet that is formatted according to a packet type. The processor is also configured to determine whether the processor in configured to process the packet type. Responsive to a determination that the processor is not configured to process the packet type, the processor is configured to cause the network interface to send packet information to a network controller. The processor is further configured to receive, via the network interface, at least one packet handling module including instructions on processing the packet type of the received packet. The processor is also configured to install the at least one packet handling module enabling the processor to process the packet type. The processor is further configured to process the packet according to the instructions in the at least one packet handling module.

In yet another form, a system is provided comprising a network element and a network controller. The network element is configured to receive a packet formatted according to a packet type and determine whether the network element is configured to process the packet type. Responsive to a determination that the network element is not configured to process the packet type, the network element is configured to send packet information to a network controller. The network element is also configured to receive from the network controller at least one packet handling module including instructions on processing the packet type of the received packet. The network element is further configured to install the at least one packet handling module enabling the network element to process the packet type. The network element is also configured to process the packet according to the instructions in the at least one packet handling module. The network controller is configured to receive the packet information from the network element and determine the packet type from the packet information. The network controller is also configured to select at least one packet handling module that includes instructions on processing the packet type. The network controller is further configured to send the at least one packet handling module to the network element.

In still another form, one or more non-transitory computer readable storage media is encoded with software comprising computer executable instructions and, when the software is executed by a processor on a network element, operable to cause the processor to receive a packet at the network element. The packet is formatted according to a packet type. The software also causes the processor to determine whether the network element is configured to process the packet type. Responsive to a determination that that network element is not configured to process the packet type, the causes the processor to send packet information to a network controller. The software also causes the processor to receive at least one packet handling module that includes instructions on processing the packet type of the received packet. The software causes the processor to install the at least one packet handling module on the network element, configuring the network element to process the packet type. The software also causes the processor to process the packet according to the instructions in the at least one packet handling module.

The above description is intended by way of example only. Although the present disclosure has been described in detail with reference to particular arrangements and configurations, these example configurations and arrangements may be changed significantly without departing from the scope of the present disclosure.

What is claimed is:

1. A method comprising:
   receiving a packet at a network element, the packet formatted according to a packet type;
   determining, at the network element, whether the packet type is an unknown packet type that the network element is not configured to process;
   responsive to a determination that the network element is not configured to process the unknown packet type, sending packet information including at least a portion of the packet from the network element to a remote network controller;
   receiving at least one packet handling module from the remote network controller, the at least one packet handling module including instructions for processing the packet type of the packet;
   installing the at least one packet handling module on the network element configuring the network element to process the packet type;
   processing the packet at the network element according to the instructions in the at least one packet handling module;
   starting a time-out timer associated with the packet type; and
   responsive to an expiration of the time-out timer before the network element receives another packet of the packet type, uninstalling the at least one packet handling module from the network element.

2. The method of claim 1, wherein the at least one packet handling module includes instructions for processing packets according to Internet Protocol version 4 (IPv4) or Internet Protocol version 6 (IPv6).

3. The method of claim 2, wherein the at least one packet handling module includes instructions for processing packets with a feature selected from a group consisting of Network Address Translation (NAT), Multiprotocol Label Switching (MPLS), Service Function Chaining (SFC), simple forwarding, filtering, and a firewall service.

4. The method of claim 1, further comprising responsive to receiving a notification from the remote network controller, uninstalling a selected packet handling module among a plurality of packet handling modules that includes the at least one packet handling module.

5. The method of claim 1, wherein processing the packet further comprises:
   determining a destination address of the packet; and
   forwarding the packet toward the destination address according to the instructions in the at least one packet handling module.

6. The method of claim 5, wherein determining the destination address comprises:

determining a destination endpoint of the packet;
requesting from a remote address directory service, the destination address corresponding to the destination endpoint; and
receiving the destination address from the remote address directory service.

7. An apparatus comprising:
a network interface configured to send and receive network traffic between computing devices; and
a processor configured to:
receive a packet via the network interface, the packet formatted according to a packet type;
determine whether the packet type is an unknown packet type that the processor is not configured to process;
responsive to a determination that the processor is not configured to process the unknown packet type, causing the network interface to send packet information including at least a portion of the packet to a remote network controller;
receive from the remote network controller, via the network interface, at least one packet handling module including instructions for processing the packet type of the packet;
install the at least one packet handling module enabling the processor to process the packet type;
process the packet according to the instructions in the at least one packet handling module;
start a time-out timer associated with the packet type; and
responsive to an expiration of the time-out timer before the network interface receives another packet of the packet type, uninstall the at least one packet handling module.

8. The apparatus of claim 7, wherein the at least one packet handling module includes instructions for processing packets according to Internet Protocol version 4 (IPv4) or Internet Protocol version 6 (IPv6).

9. The apparatus of claim 8, wherein the at least one packet handling module includes instructions for processing packets with a feature selected from a group consisting of Network Address Translation (NAT), Multiprotocol Label Switching (MPLS), Service Function Chaining (SFC), simple forwarding, filtering, and a firewall service.

10. The apparatus of claim 7, wherein responsive to receiving a notification from the remote network controller via the network interface, the processor is further configured to uninstall a selected packet handling module among a plurality of packet handling modules that includes the at least one packet handling module.

11. The apparatus of claim 7, wherein the processor is configured to process the packet by:
determining a destination address of the packet; and
forwarding the packet via the network interface towards the destination address according to the instructions in the at least one packet handling module.

12. The apparatus of claim 11, wherein the processor is configured to determine the destination address by:
determining a destination endpoint of the packet;
causing the network interface to request from a remote address directory service, the destination address corresponding to the destination endpoint; and
receiving the destination address from the remote address directory service via the network interface.

13. A system comprising:
a remote network controller; and
a network element configured to:
receive a packet formatted according to a packet type;
determine whether the packet type is an unknown packet type that the network element is not configured to process;
responsive to a determination that the network element is not configured to process the unknown packet type, send packet information including at least a portion of the packet to the remote network controller;
receive from the remote network controller, at least one packet handling module including instructions for processing the packet type of the packet;
install the at least one packet handling module enabling the network element to process the packet type;
process the packet according to the instructions in the at least one packet handling module;
start a time-out timer associated with the packet type; and
responsive to an expiration of the time-out timer before the network element receives another packet of the packet type, uninstall the at least one packet handling module from the network element; and
the remote network controller configured to:
receive the packet information from the network element;
determine the packet type from the packet information;
choose at least one packet handling module that includes instructions for processing the packet type; and
send the at least one packet handling module to the network element.

14. The system of claim 13, wherein the remote network controller is configured to select the at least one packet handling module to include instructions for processing packets according to Internet Protocol version 4 (IPv4) or Internet Protocol version 6 (IPv6).

15. The system of claim 14, wherein the remote network controller is configured to select the at least one packet handling module to include instructions for processing packets with a feature selected from a group consisting of Network Address Translation (NAT), Multiprotocol Label Switching (MPLS), Service Function Chaining (SFC), simple forwarding, filtering, and a firewall service.

16. The system of claim 13, wherein the remote network controller is further configured to send a notification to uninstall a selected packet handling module among a plurality of packet handling modules that includes the at least one packet handling module, and
wherein, responsive to receiving the notification from the remote network controller, the network element is further configured to uninstall the selected packet handling module.

17. The system of claim 13, wherein the network element is configured to process the packet by:
determining a destination address of the packet; and
forwarding the packet toward the destination address according to the instructions in the at least one packet handling module.

18. The system of claim 17, wherein the network element is configured to determine the destination address by:
determining a destination endpoint of the packet;
requesting from a remote address directory service, the destination address corresponding to the destination endpoint; and receiving the destination address from the remote address directory service.

19. The system of claim 18, wherein the remote network controller is configured to provide the remote address directory service.

20. The system of claim 18, further comprising a remote server separate from the remote network controller, the remote server configured to provide the remote address directory service.

* * * * *